June 26, 1951 F. NIENABER ET AL 2,558,454

RADIO SIGNAL RECEPTION AND TUNING

Filed Aug. 17, 1949 5 Sheets-Sheet 1

INVENTORS:
Frank Nienaber,
Martin Henderson,
Emil L. Ransseen,
Chester W. Lytle,
By Thos. A. Banning Jr.
Atty.

INVENTOR.
Frank Nienaber,
Martin Henderson,
Emil L. Ranseen,
Chester W. Lytle,
By [signature]
Atty.

RADIO SIGNAL RECEPTION AND TUNING

Filed Aug. 17, 1949 5 Sheets-Sheet 3

INVENTORS:
Frank Nienaber,
Martin Henderson,
Emil L. Ranseen,
Chester W. Lytle,
By [signature] Atty.

RADIO SIGNAL RECEPTION AND TUNING

Filed Aug. 17, 1949 5 Sheets-Sheet 4

Inventors:
Frank Nienaber,
Martin Henderson,
Emil L. Ranseen,
Chester W. Lytle,
By Thos. A. [signature] Atty.

INVENTORS:
Frank Nienaber,
Martin Henderson,
Emil L. Ranseen,
Chester W. Lytle
By Thos. A. [signature] Atty.

Patented June 26, 1951

2,558,454

UNITED STATES PATENT OFFICE 2,558,454

RADIO SIGNAL RECEPTION AND TUNING

Frank Nienaber, Chicago, Martin Henderson, Libertyville, and Emil L. Ranseen and Chester W. Lytle, Chicago, Ill., assignors to Chester W. Lytle, Chicago, Ill.

Application August 17, 1949, Serial No. 110,722

31 Claims. (Cl. 250—40)

This invention relates to improvements in radio signal reception and tuning, and the like. Briefly stated the invention relates to improvements in the means for receiving and tuning radio signals in either or both the FM and television bands as such bands are understood at the present time. In a broader sense the invention concerns itself with reception and tuning through two or more bands of frequencies which bands occupy different ranges of the spectrum. In a more limited sense the invention concerns itself with provision of means to tune any selected channel of either the so-called "low range" band or the so-called "high range band," and also to tune to any selected FM frequency emitted by a sound transmitting station operating on the FM principle.

The bands and frequencies, and the channel frequencies used in television transmission and in sound transmission on the FM principle are assigned according to the determinations of the proper legal authority, and are subject to change from time to time. Such changes as are made may affect either the ranges of the television bands and the frequencies assigned to various channels of each band, and may affect the frequencies assigned to various FM emitting stations for sound emission. In order to better explain the features of the present invention and the purposes and objects herein attained we shall first mention the relationships presently existing between the various television and FM frequencies as now being used, but in so doing we wish it understood that we do not thereby intend to limit either the scope of the protection herein covered, nor the usefulness of the present invention.

At the present time the low band for television lies within the range of 55–88 megacycles, the FM frequencies for sound lie within the range of 88–108 megacycles, and the high band for television lies within the range of 175–215 megacycles, the range from 108 to 175 being either unassigned or assigned for other purposes. Within the low television band there are assigned 5 channels, and within the high television band there are assigned 7 channels, according to present rulings of the authority. Within the FM band or range there are assigned a large number of station frequencies some of which lie very close together so that slight changes of tuning bring in other FM stations. A receiver intended for use for either or both television or FM reception should include provision for exactly tuning to any selected television channel frequency in either the high or the low television band, and should include provision for exactly tuning to any selected FM station frequency. Accordingly, such a universally usable tuner should include provision for exactly tuning to any one of 12 television channels (or a greater number of channels if such greater number should be hereafter assigned by the authority); and such tuner should include provision for exactly tuning to any selected one of a large number of FM frequencies. Such a tuner is herein disclosed.

Examination of the relationship of the several frequency ranges for the two television bands and for the FM range as stated above shows that it is possible to tune through the complete range of frequencies by variation of an impedance (for example, either an inductor of a capacitor) through a sufficient range to meet the requirements of all frequencies between 55 and 215 megacycles. However, an impedance capable of a sufficient range of variation to meet the requirements of such a range of frequency tuning would be unduly large or would present other serious objections for use in such a tuning circuit, or the circuit itself would present great difficulties in design or construction. It is therefore desirable to divide the tuning operations, and the circuits used in such operations to correspond generally to the two television bands and the range of FM tuning to be effected.

It is an object of the present invention to provide two variable impedances, for example one for the low television band and the other for the high television band, each such variable impedance being variable through a range sufficient to meet the circuit requirements for tuning through the range of the corresponding television band; and it is a further object of the invention to physically connect these variable impedances together so that during tuning operations they move together, thus making it possible to effect tuning to any selected channel in either of the television bands by movement of a single tuning element. Conveniently each of these variable impedances may comprise several distinct impedance elements for different portions of the tuning circuit or circuits, all of such distinct impedance elements, however, including portions which are movable simultaneously during tuning. Conveniently, also, the variable impedance elements for each television band are so designed that they effect complete variation of impedance through the necessary range of adjustments for the television band which they tune, by movement through substantially 180 degrees or somewhat less movement, that is, one-half revolution of the movable element. This is in harmony with the use of variable impedances, either inductors or capacitors, which are provided with stators and with adjacent rotors, the cooperating stator and rotor elements being designed so that a rotary movement of 180 degrees effects variation between substantially zero effect and full effect of such impedance element.

It is a further object of the invention to so relate these two variable impedances to each other and to the circuits of which they comprise parts, that during rotary movements of the tuning element through arcuate segments of one half rotation the variable impedance or impedance elements for the low television band are effective, and that during rotary movements of the tuning element through arcuate segments of the other half rotation the variable impedance or impedance elements for the high television band are effective. It is also an object of the invention to provide these two variable impedances of such values with respect to each other and to the circuits of which they comprise portions, that tuning through the full range of frequencies between the lowest frequency of the low television band and the highest frequency of the high television band may be effected by rotary movement of the rotary element in the same direction through one complete rotation. That is, for the cited example of bands embracing the range between 55 and 215 megacycles for the low and high bands the tuned frequency variation from the beginning of a rotary cycle to its ending would be between the limits of 55 and 215 megacycles. It is noted, however, that during this full rotation there has been a break of operations between the high frequency of the low television band and the low frequency of the high television band, that is, a break between 88 and 175 megacycles. In other words, at the beginning of the rotary cycle the tuned frequency is 55, at completion of the first half rotation or thereabouts, the tuned frequency is 88, at commencement of the second half rotation, or thereabouts the tuned frequency must jump from 88 to 175, being the low frequency for the high television band, and at completion of the second half rotation, or thereabouts, the tuned frequency must be 215. Thus provision must be made for the sudden jump from 88 to 175, that is, from the high end of the low television band to the low end of the high television band.

One of the previously mentioned variable impedances of groups of impedances, is capable of tuning between the 55 and 88 megacycle limits for the low television band, and the other of said previously mentioned variable impedances or groups of impedances, is capable of tuning between the 175 and 215 megacycle limits, in each case by rotary movement of not over 180 degrees; and these two variable impedances or sets of impedances are so related that they come into operation successively or sequentially. Furthermore, this sequence is so devised that if the impedance variation is of a decreasing amount with increase of frequency (as in the case of variable inductors, for example), the impedances of the variable elements used for the low television band will commence at maximum values for the low end of that band, and will reduce to minimum values for the high end of that band; that the variable elements of the other impedance or set of impedances used for the high television band will occupy their maximum impedance value positions when the high end of the low band is reached (corresponding substantially to the low end of the high band); and that the impedances of the high band elements will thus commence at maximum values for the low end of the high band and will reduce to minimum values for the high end of the high band.

By means of the foregoing arrangement it is possible to tune through the full range of both television bands by a single rotary movement or movements of the rotary element, such single rotary movement embracing not over 360 degrees of rotation, namely, one complete revolution.

It is a further object of the invention to provide, in connection with the parts already referred to, and in connection with the circuits for the low and high television bands, suitable switching means operable to bring into effect either the impedance element or elements for the low television band, or the impedance element or elements for the high television band as needed according to whether the low or the high band is being tuned. Such switching means is so arranged and connected that during tuning movement of the impedance element or elements for the low band said low band elements are in circuit and the elements for the high band are out of circuit; and is so arranged that during tuning movement of the impedance element or elements for the high band said high band elements are in circuit and the elements for the low band are out of circuit. Thus it is an object to make provision for changing the necessary connections by such switching means when the movement of the impedance elements passes from the low television band to the high television band, or vice versa.

It is a further object in connection with the features previously referred to to make provision for tuning the FM range by rotary movement of the same rotary element which has already been referred to.

The tuning through the low and high television bands as hereinbefore explained is accomplished by rotary movement of the impedance element through 360 degrees of rotation, and thus effecting tuning from the low end of the low band to the high end of the high band. It is a further object to effect tuning of the FM range for sound reception by a further rotary movement of this element through an additional 180 degrees or half-rotation. In this connection it is an object to commence tuning the low end of the FM range directly or shortly after additional rotary movement commences (beyond completion of the high end of the high television band), and to tune through the range of the FM frequencies during the continued or additional 180 degrees of rotary movement. It is here noted that during this half rotation of movement the rotary elements of those impedances which were employed during tuning of the low television band are being moved for a second time through the same impedance variation movements as they effected during the movement through the low television band from the low end to the high end of that low television band. Accordingly, in the absence of special provision to change the effect of these impedances during this second or repeat tuning movement of these impedance elements the effect would be to tune through the low television band for a second time, and proper tuning of the FM range would not occur.

It is, therefore, a further object of the invention to make provision for modifying or changing the tuning effect produced by this variable impedance or set of impedances when moving for a second time through their 180 degrees of tuning movement, so that during this second 180 degrees of tuning movement these impedances will serve to tune through the FM range, that is, between 88 and 108 megacycles, instead of through the low television band, that is, between 55 and 88 megacycles. By this means the same variable impedance or set of impedances which is used for tuning the low television band is also used, but in modified arrangement, for tuning the FM range.

It is a further object to provide such switching means with suitable arrangements for effecting the necessary modifications of the tuning circuits to enable said single variable impedance or set of impedances to effect tuning through both the low television band and the FM range.

In connection with the foregoing it is a further object of the invention to effect the necessary modification of the tuning circuits as above referred to by simple means, in the form of a shunt or shunts switched into circuit by such switching means during the operations through the repeat 180 degrees of rotation. Such shunt or shunts modify the tuned frequency for a given position of the rotary element to such degree that the tuning occurs within the FM range as long as such shunt or shunts are connected into circuit by the switching means.

It is a further object to provide such switching means which will move from one switched position to another as the rotary element moves between the low and high television bands, or between the high television band and the FM range, or vice versa.

It is noted that according to the principle just above explained the tuning through the FM range is effected by use of the same variable impedance as was used during tuning in one of the television bands, but with modification of the frequency tuned for any given position of such variable impedance. It is also noted that in the arrangement above explained use is made of that variable impedance which is normally used for tuning the low television band, for supplemental use in tuning within the FM range. Also, that since the low television band uses frequencies less than those used in the FM range the modification is effected by raising the frequency delivered or tuned for a given position of that variable impedance, and that such modification is effected by shunting an impedance of fixed value across that variable impedance.

As a modification of such arrangement we also contemplate arrangements in which use may be made of the variable impedance or impedances which are normally used for tuning the high television band, for supplemental tuning in the FM range. By such modified arrangement provision is made for shunting a fixed impedance across the variable impedance normally used for tuning the high television band, thereby lowering the frequency tuned for a given position or setting of such variable impedance or impedances.

In the arrangements to be hereinafter illustrated and described in detail we have disclosed the use of variable inductors as the variable impedances used for effecting tuning. Evidently, however, use could be made of variable capacitors for effecting such tuning. In the case of use of variable capacitors as just stated another inductor of fixed value might be shunted across the capacitor used normally for tuning in the low television band to shift the tuning into the range of the FM frequencies.

In the modified arrangement above referred to wherein the variable impedances normally used for tuning in the high television band are also used for tuning in the FM range, by shifting the tuned frequency for a given setting of the said variable impedance, when such variable impedance is in the form of variable inductors as hereinafter illustrated and described, the lowering of the tuned frequency necessary to use such variable impedance (of the high television band) for tuning in the FM range can be effected by shunting a fixed capacitor across such variable impedance, suitable switching means being provided for such purpose.

It will now be seen that we contemplate the use of variable impedances for normal use in the low and high television bands, such variable impedances being either inductors or capacitors; and it will further be seen that we contemplate using either one of such variable impedances for tuning in the FM range by shunting or modifying the circuit, so as to shift the range within which tuning will be effected, such shift being sufficient to enable tuning within the FM range by use of such variable impedance which is normally used for the television band, either the low band or the high band.

A further feature of the invention relates to the provision of a tuner arrangement wherein there is provided a variable impedance element which can be moved by rotary or other continuous tuning movement between two extremes of movement, so to enable exact tuning to any selected frequency within the range provided for such tuning operations, together with further means to enable exact tuning of such variable impedance by what may be called "index" tuning. By means of this "index" tuning it is possible to move the variable impedance element to a roughly tuned position, corresponding to a selected station, and to thereafter effect further movements of such variable impedance element to effect exact tuning to the selected station frequency. It is here noted that such further and exact tuning movement is effected in the main variable impedance element itself, and not in a supplemental or additional variable impedance of small size coordinated with the main variable impedance element. In so-called "vernier" tuning as heretofore practiced use is made of a small variable impedance which may be separately tuned for bringing the entire system to the exactly tuned condition. Our present tuner, as will hereinafter appear, is provided with means to quickly and simply bring the variable impedance to a "station" position, or a "channel" position, together with means to thereafter readily move such main impedance slightly to the exact position necessary for exact tuning of the station or channel selected. This feature of the present invention includes means whereby the movable tuning element may be readily and quickly moved through relatively large increments to indexing positions corresponding to various stations or channels, and for imposing momentary increased resistance to such movement at the position corresponding roughly to each station or channel as the same is reached, so that the operator will immediately be informed of the attainment of position corresponding to such station or channel. We have then combined with such parts, means to readily move the variable impedance element to exact tuning position, while maintaining the indexed position previously attained for the station or channel in question.

A further feature of the invention relates to the provision of means whereby when tuning is to be effected within the FM range such indexing means, or such means to impose resistance to movement of the variable impedance, is placed in inoperative condition, so that when tuning in the FM range such tuning may be continuous throughout such range, and not intermittently, or by stations or channels. In other words, we have herein disclosed means whereby when tuning for either of the television bands, to tune to any selected channel of such band, such tuning may be effected by "indexing" combined with supplemental exact tuning, and when tuning within the FM range such tuning may be continuous to any selected frequency or station. The desirability of such arrangements will appear from the following statements:

The tuning element effects a complete half-rotation during tuning through the range of either the low or the high television band, and also effects a further half-rotation during tuning through the range of the FM frequencies. Since there are only a few assigned channels for either television band (at present five in the low band and seven in the high band) it is possible to design the tuner for relatively large arcuate movements from channel to channel tuning, and provision may readily be made for the indexing or step-by-step interruptions at positions roughly corresponding to these few channels. Provision may also be readily made for exact tuning at the position of each such indexing point by slight movement of the variable impedance element to one side or the other of such indexing position. In the case of exact tuning to a selected FM frequency, however, many more stations than seven must be provided for within the lower and upper limits of tuning so that it would not be practically possible to make provision for indexing to all of these many stations within a half-rotation of the tuning element. Accordingly, it is desirable to be able to effect "continuous" tuning through the range of the FM stations, and for this reason we have made provision for discontinuing the "indexing" operation when tuning within the FM range.

It is, however, an object to make provision for making possible exact tuning to any selected station within the FM range, although the "rough" tuning to such selected station within the FM range may be effected by such "continuous" tuning instead of by "indexing." In other words, when tuning in the FM range such tuning is "continuous" as distinguished from "indexing," but still it is also possible to effect slight corrections in the tuning to any selected FM station after such station has been approximately tuned.

A further object of the invention is to provide a substantially self-contained tuner for use with either or both television and FM reception, which tuner is so constituted that it may be used with a large variety of well known interpreting circuits for both television and FM reception. This self-contained tuner is so constituted that it contains within its confines substantially all electrical and tuning elements needed to deliver to the picture circuits the frequency or frequencies needed for operation thereof in normal manner; and for delivery to the sound circuit that frequency needed for proper operation thereof. In this connection and as one embodiment of the invention but not as a limitation, it is an object of the invention to provide such substantially self-contained tuner unit which is capable of use with any form of television interpreting circuit and also for FM reception providing that the sound system for the television circuit is not dependent on two carrier frequencies. It is thus an object of the invention to provide a substantially self-contained tuner unit which can be used in any receiver for both television and FM reception wherein provision is made for a separate sound intermediate frequency channel. In connection with the foregoing features the presently to be disclosed tuning unit includes an intermediate frequency transformer or "sound trap" which separates the two intermediate frequencies, namely that for the operation of the kinescope of the television element, and that for the operation of the sound circuit. In this connection it is mentioned that the sound intermediate frequency channel is a relatively narrow band and that the picture intermediate frequency channel is a relatively broad band.

A further feature and object of the invention is to make provision for normally disconnecting current supply to the kinescope element when operating through the present tuner unit on the FM range for sound reception only. This function is effected by a suitable switching element in conjunction with the switching elements or switch operating means already referred to. This supplemental switching element may also be used for giving a signal (visual or otherwise) or for controlling a circuit for other purposes when passing to or from the FM portion of the tuner.

Another feature and object of the invention is to provide a simple form of visible dial or scale in connection with the tuning unit, and which dial or scale is provided with suitable markings corresponding to television channels and bands, and also corresponding to the full FM range of tuning, all said markings being arranged in substantially continuous reading arrangement; and to provide in connection with such dial or scale a pointer or indicator which is operable over all portions of such dial or scale in harmony with the tuner operations, and to indicate visibly the tuned condition of the tuning unit for any and all conditions of use thereof.

A further feature and object of the invention is to provide a suitable and simple arrangement of "indexing" plate which is used in connection with the "indexing" tuning previously referred to, and which indexing plate may be readily removed or replaced by another suitable indexing plate carrying other indexing positions corresponding to additional or changed television channels which may be allocated from time to time by the authority, or carrying differently located indexing positions corresponding to changed channel frequencies or other like changes.

Other objects and uses of the invention will appear from a detailed description of the same, which consists in the features of construction and combinations of parts hereinafter described and claimed.

Figures 1, 2, 3:
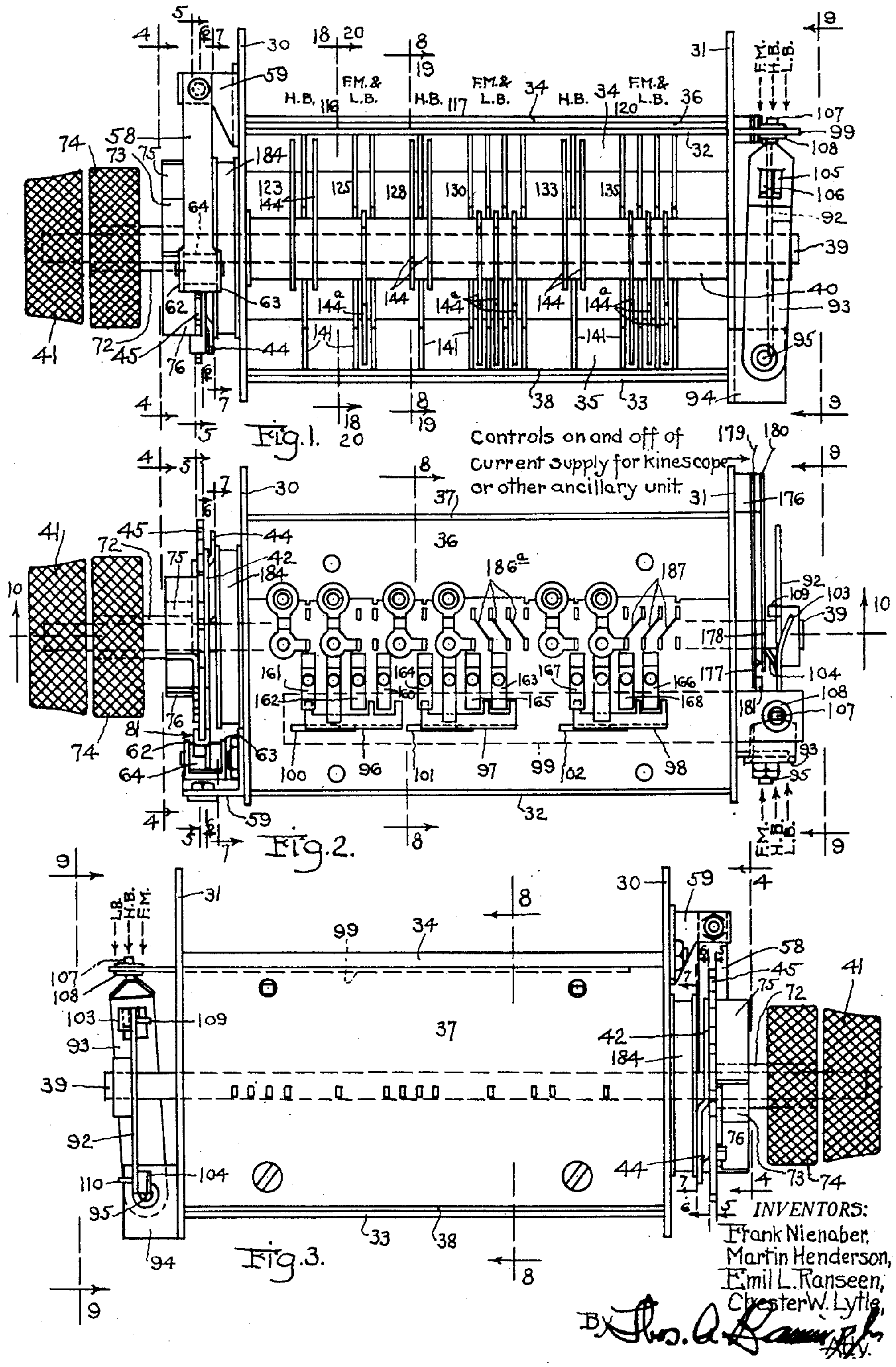
Figure 1 shows a side elevation of a tuner unit embodying the features of the present invention, the housing or casing being removed from the unit, and the parts being shown by way of example in one of the high television band channel positions.
Figure 2 shows a top or plan view corresponding to Figure 1.
Figure 3 shows a side elevation corresponding to Figures 1 and 2, but looking at the side opposite to Figure 1.
Figures 4, 5, 6, 7, 8, 9:
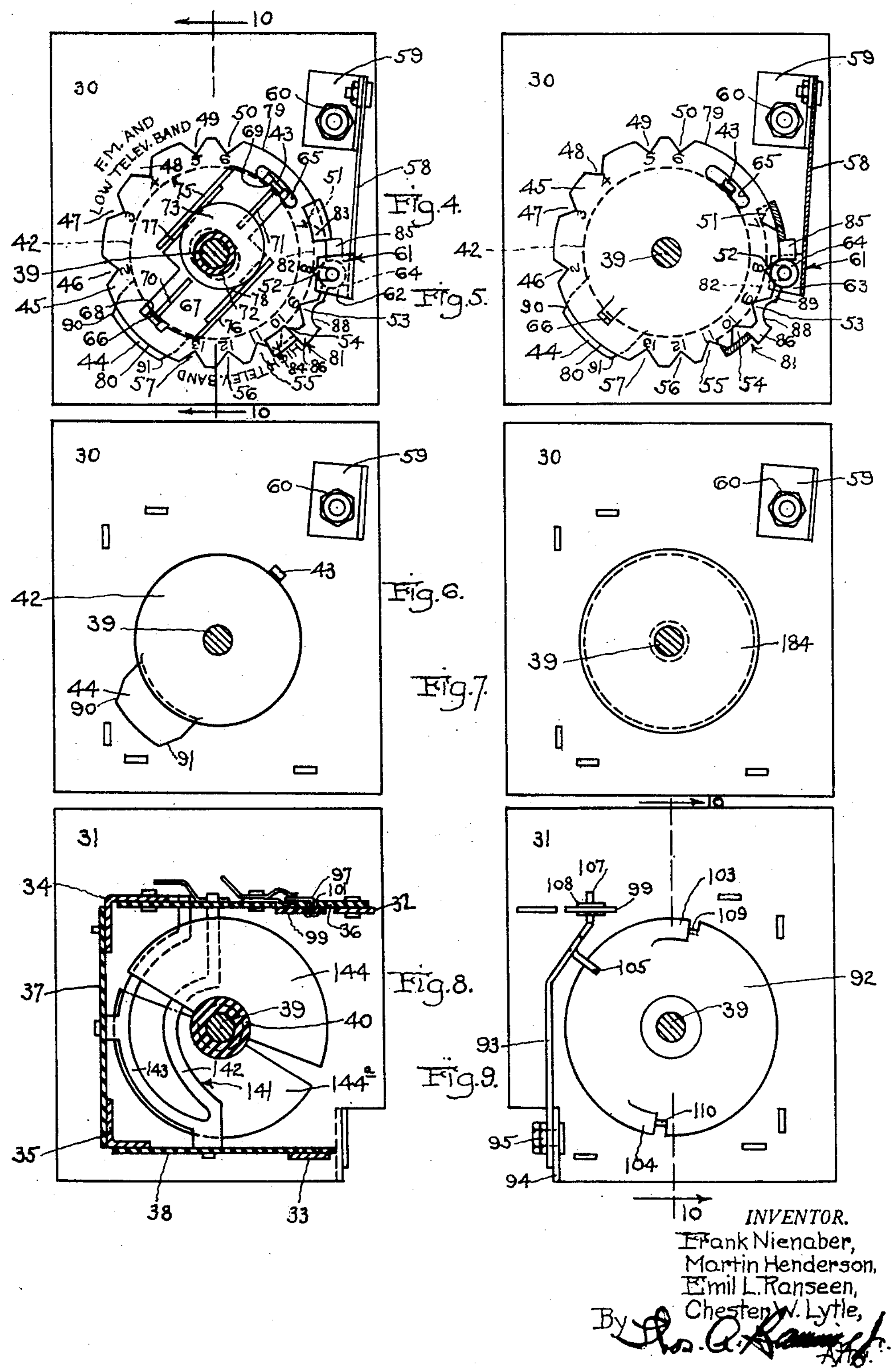
Figure 4 shows a cross-section taken on the line 4—4 of Figures 1, 2, 3 and 10, looking in the directions of the arrows, and this figure shows the indexing plate and the fine tuning means, the hand knobs being removed or cut away, and in this figure the indexing plate shows that the unit has been indexed to the position of channel "8" of the high television band.
Figure 5 shows a cross-section taken on the line 5—5 of Figures 1, 2, 3 and 10, and it shows the fine tuning means removed to more fully show the indexing plate, the parts standing in the same position as shown in Figure 4.
Figure 6 shows a cross-section taken on the line 6—6 of Figures 1, 2, 3 and 10, and it shows the drive element which is connected to the shaft of the variable impedance elements, and which drive element serves to rotate the variable impedance elements first to indexing position and then to exact tuned position.
Figure 7 shows a cross-section taken on the line 7—7 of Figures 1, 2, 3 and 10, and it shows the small drum which drives the cord whereby the dial or scale pointer is moved to indicating positions corresponding to tuning positions of the tuner unit.
Figure 8 shows a cross-section taken on the lines 8—8 of Figures 1, 2, 3 and 10, and it shows one of the variable impedance elements including the rotor and the stator of an inductor, the element shown being one of the variable impedance elements used in tuning the high television band.
Figure 9 shows a back end view of the unit shown in Figures 1 to 8, inclusive, and it shows the switch operating cam plate together with the cooperating follower element, the cam plate being in position which it occupies when the variable impedance element is in the position shown in Figure 8.
Figure 10:
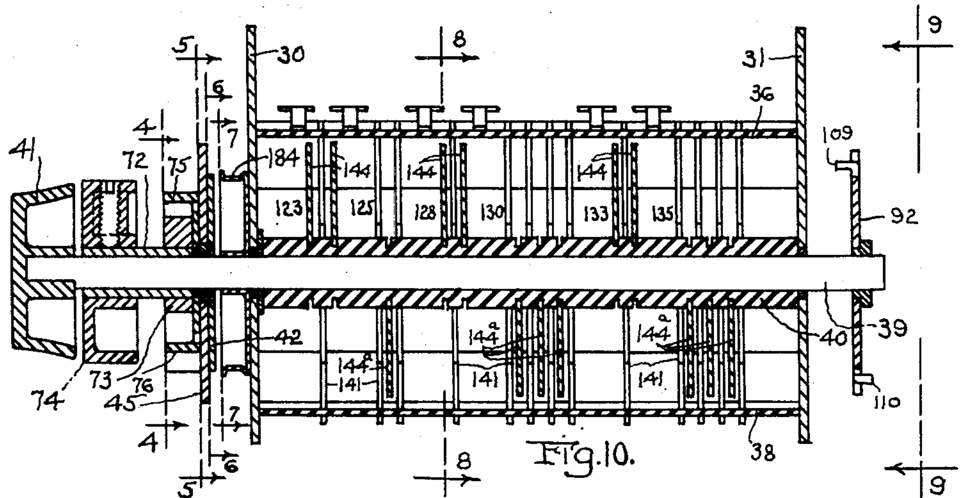
Figures 11, 12, 13, 14, 15, 16, 17:
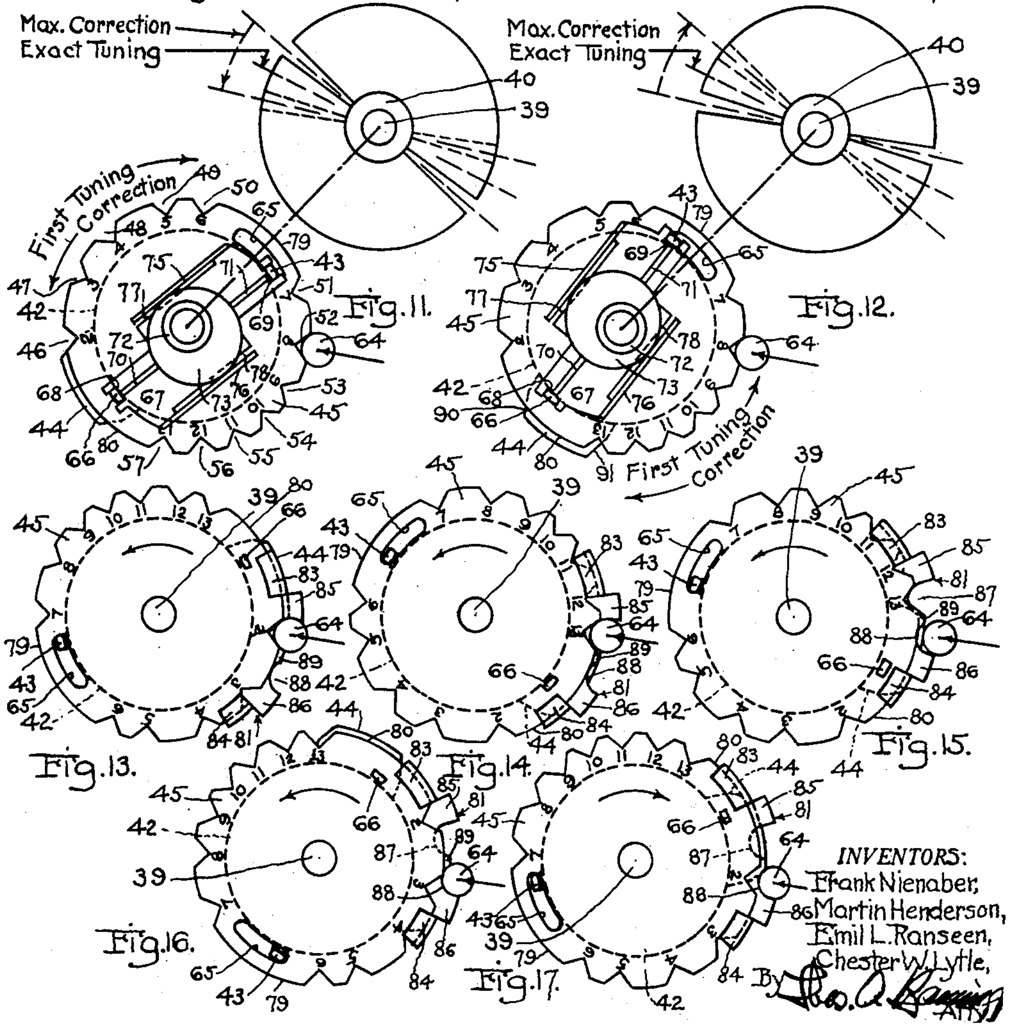
Figures 18, 19, 20:
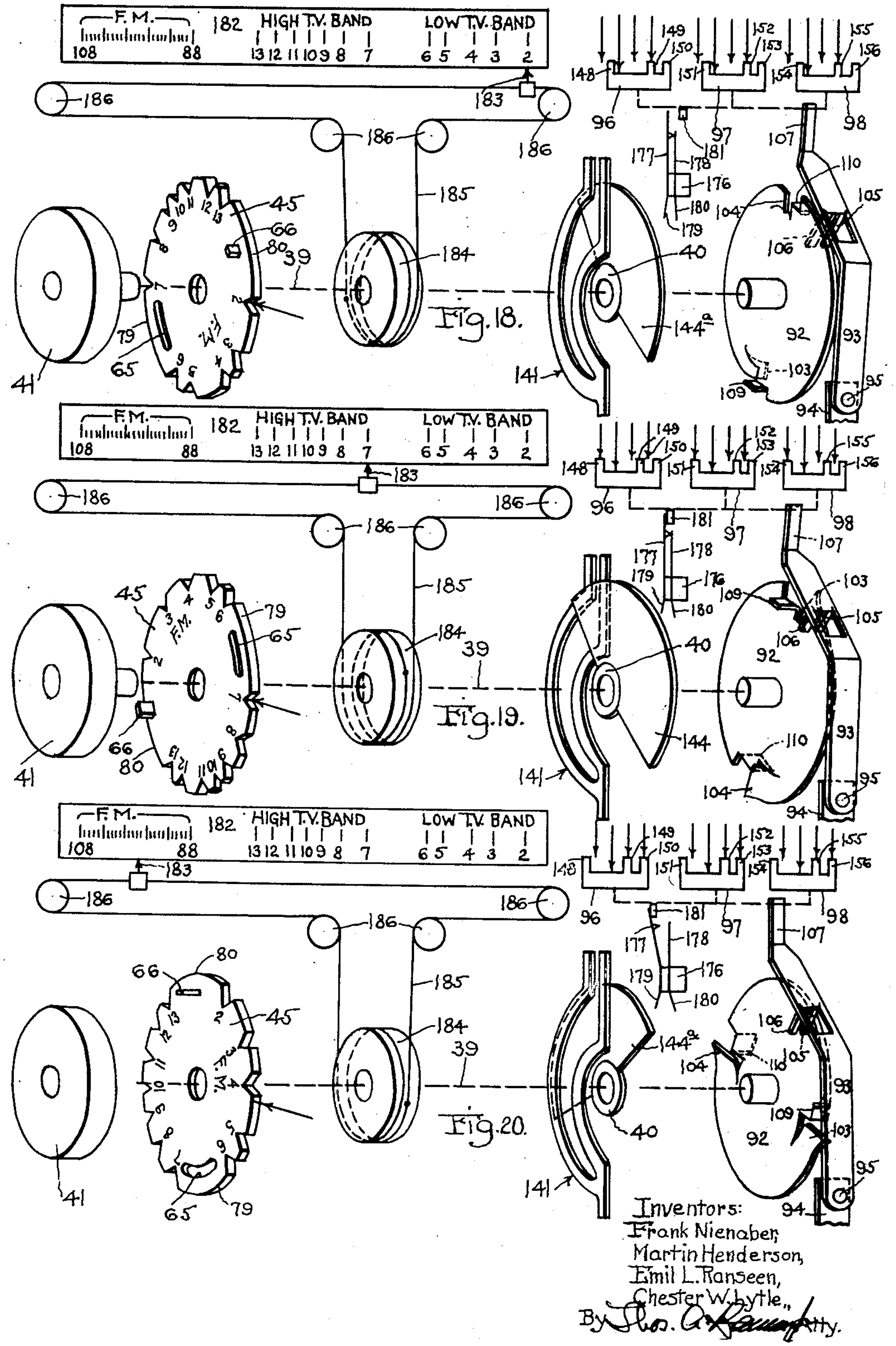
Figure 21:
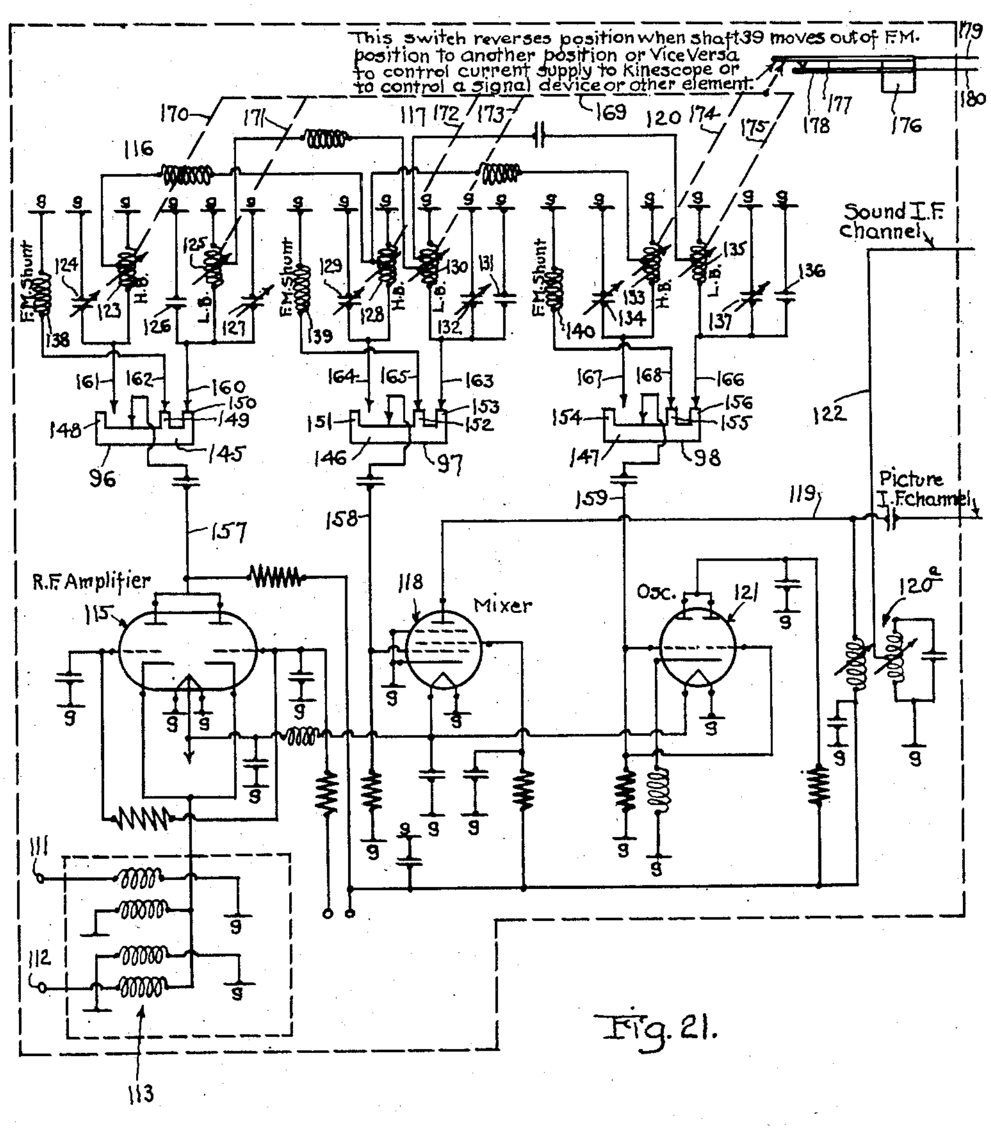

Figure 10 shows a longitudinal section taken on the lines 10—10 of Figures 2, 4 and 9, looking in the directions of the arrows, the parts being in the position which they occupy when tuned to channel 8 of the high television band;

Figure 11 shows schematically and in perspective and in "exploded" form the relative positions of the indexing plate, the "click" roller for rough tuning at channel positions, and the rotors of the variable impedance units, and this figure shows the relative positions of these parts when tuning from a higher to a lower channel position, and the manner in which the fine tuning means acts to effect necessary correction to secure exact tuning for the selected television channel, being channel 8 of the high band;

Figure 12 shows a view corresponding to Figure 11, but Figure 12 shows the parts when tuning from a lower to a higher channel position;

Figure 13 shows schematically the indexing plate, the "click" roller, and the shoe in their relative positions when tuning in the low television band, the indexing plate standing at the "2" channel position;

Figure 14 shows a view similar to that of Figure 13, but with the indexing plate at the channel "13" position, being at the top of the high television band, the rotary movement of the indexing plate having been counter-clockwise and from lower to higher channel positions;

Figure 15 shows a view similar to those of Figures 13 and 14, but in Figure 15 the indexing plate has been moved a further angle in the counter-clockwise direction to bring the shoe into position to raise the "click" roller away from the indexing plate notches and allow for free and continuous rotary movement of the indexing plate during tuning;

Figure 16 shows a view similar to those of Figure 13, 14 and 15, and it shows the indexing plate moved still further in the counter-clockwise direction, and away from the transition position of Figure 15, to tune continuously in the FM range, the tuning having been carried to an FM position wherein the indexing plate occupies a position between the 2 and 3 channel, low band positions, and close to the 3 channel position, tuning having been in the counter-clockwise direction;

Figure 17 shows a view similar to Figures 13, 14, 15, and 16, but the indexing plate having been rotated back in the clockwise direction to the transition or transfer point, and the parts being ready for transfer back to indexing operation in the high television band;

Figure 18 shows a schematic and perspective "exploded" view of the hand grip, the indexing plate, the low television band variable impedance element, the cam disk, the switch operating elements, the switches, the dial operating drum, the dial or scale, and the pointer therefor, the parts standing in their low television band for channel "2";

Figure 19 shows a view similar to that of Figure 18, but with the parts in their high television band position for channel "7";

Figure 20 shows a view similar to those of Figures 18 and 19, but with the parts in their FM range position for tuning at about the center of the FM range; and Figure 21 shows a wiring diagram for a typical set of circuits of the tuning unit herein disclosed, the arrangement shown in this wiring diagram being one in which the variable impedances are inductors, and in which the tuning through the FM range is effected by the variable impedances used for the low television band, and in which the shunting of these variable impedances for FM tuning is effected by use of fixed inductances of proper proportions to rise the tuning range from the range of the low television band to the range of the FM requirements.

Figures 1 to 18, inclusive, are shown on substantially full scale.

Referring now to the drawings, we have therein shown a tuning unit of convenient arrangement. It includes the frame including the front and back end plates 30 and 31 which are connected together by the plates 32 and 33 and the upper and lower angles 34 and 35. Conveniently these plates support the insulating sheets 36, 37 and 38 by which various electrical elements are supported.

The shaft 39 extends longitudinally through the tuner and is journalled in the end plates 30 and 31. Secured to this shaft is the insulating cylinder or tube 40 which carries the movable impedance elements presently to be referred to. Adjacent to the movable impedance elements just referred to are various stationary impedance elements which constitute portions of the tuning circuits and whose impedances are varied by the movements of the movable impedance elements by shaft rotation in well understood manner. These will be referred to hereinafter.

The shaft 39 is capable of substantially 540 degrees of rotation, being one and one-half revolutions. The arrangement is such that, commencing at an assumed zero or initial position, during the first half rotation tuning is effected through one television band, for example, the low band, then during the second half rotation tuning is effected through the other television band, for example, the high band, and then during the third half rotation tuning is effected through the FM range, to a final or terminal position. Thus, tuning is effected through all three ranges by unidirectional shaft rotation, the several ranges being tuned sequentially.

The forwardly projecting portion of the shaft 39, in front of the front plate 30, carries a knob or button 41 by which said shaft may be directly rotated for direct tuning. Between this knob 41 and the front plate 30 the shaft has secured to it the plate 42 which has the forwardly projecting lug 43. This plate also carries an outwardly extending enlargement cam or dwell 44 whose function will presently appear. The lug 43 and dwell 44 are conveniently located in direct opposition, that is, one half revolution apart as shown in Figure 6.

Between the knob 41 and the plate 42 there is located on the shaft the indexing plate 45. This indexing plate is free to rock on the shaft 39 and the shaft is free to rock with respect to the indexing plate through a limited angular displacement of amount sufficient to effect "correction" as will presently appear. This correction rocking is used for securing exact tuning to a selected television channel after such channel has been roughly tuned to an index plate position.

The index plate 45 is provided with a series of notches or other engageable elements, being the edge notches 46, 47, 48, 49, 50, 51, 52, 53, 54, 55, 56 and 57 best shown in Figure 4. These notches are located around the periphery of the index plate at relative positions roughly corresponding to displacements of the shaft angularly from its initial position which displacements must be effected to tune in the successive channels of the respective television bands. Thus it will be noted that the spacings of these notches are irregular around the periphery of the index plate. The notches 46, 47, 48, 49 and 50 correspond to the channels of the low band, and the notches 51, 52, 53, 54, 55, 56 and 57 correspond to the high band channels. It is further noted that the group of notches 46–50 inclusive is located within one semi-circle of the index plate, and that the group of notches 51–57 inclusive is located within the opposite semi-circle of the index plate.

There is a stiff spring 58 having its fixed end secured to a bracket 59 which is rockingly adjustable on the front face of the front plate 30, the screw 60 enabling such bracket to be rocked into an adjusted position, and then locked securely in such adjusted position. The free end of this leaf spring 58 is provided with a U-shaped roller pocket 61 having the inner and outer arms 62 and 63 (see Figure 2) between which the roller 64 is journalled. This roller is pressed against the edge of the index plate by the leaf spring with sufficient firmness to ensure engagement of the roller into each notch in succession, as the index plate is rotated, and to retain the index plate with sufficient firmness to ensure the functions presently to be described. Nevertheless by exerting rotary force on the index plate it may be caused to force the roller out of that notch with which such roller is momentarily engaged, thus allowing the index plate to be advanced far enough to bring the next notch into roller engagement. Thus, as the index plate is rotated the roller will successively engage the notches, and as each such engagement occurs the roller will produce a drag or hold-back force which must be overcome by the operator if he should desire to advance the tuning still further. Also, such intermittent drags or "clicks" will inform the operator as successive tuning positions are attained for successive television channels.

We have stated that there is permitted a limited amount of angular movement of the shaft with respect to the index plate. The index plate is provided with an angular slotted opening 65 which receives the lug 43 of the plate 42. Thus the above limited relative angular movement is permitted within the limits established by this opening 65.

The index plate itself is provided with a forwardly extending lug 66 diametrically opposite to the opening 65, that is, the central portion of the opening 65 is directly opposite to such index plate lug 66. There is a plate 67 directly in advance of the index plate, such plate 67 being provided on one end with the notch 68 (see Figures 4, 11 and 12) which receives the index plate lug 66, and such plate 67 being provided on its opposite end with the notch 69 which receives the lug 43 of the plate 42, which lug 43 extends through the opening 65 of the index plate far enough to engage with such notch 69. Preferably, also, the plate 67 is slotted lengthwise with the two opposite slots 70 and 71 which terminate at the notches 68 and 69, respectively. These notches are made of size to receive the respective lugs somewhat tightly so as to ensure good engagement between the parts at all times, and the slots 70 and 71 provide a slight amount of springiness in the plate 67 so that such good engagement of the lugs with the respective notches will continue irrespective of slight wear of the parts, and irrespective of slight movements between the parts which occur during "correction" movements or adjustments as will presently appear.

Rotatably mounted on the shaft 39 between the plate 67 and the knob 41 is the tubular sleeve 72. This sleeve carries the eccentric block 73 at its rear end, and the "correction" knob 74 at its front end and directly behind the knob 41. The plate 67 is provided with the forwardly reaching side flanges 75 and 76 which are parallel to each other and are separated across the width of the plate 67 by an amount to receive the eccentric block 73 with a good fit. This eccentric block is circular so is of uniform diameter; and it is displaced eccentrically from the axis of rotation of the shaft 39 by the amount of eccentricity which is desired.

In order to ensure good engagement of the flanges 75 and 76 with the eccentric block 73 at all times, and to provide for slight lack of uniformity in the parts and slight wear, we have provided the longitudinally extending slots 77 and 78 in the plate 67 and close to the flanges 75 and 76, these slots providing a slight amount of flexibility or springiness in the parts to assure good engagement between the cam block and the flanges at all times.

It will now be seen that the cam block, flanges 75 and 76, plate 67, lug 66 of the index plate, and lug 43 of the plate 42 provide a driving and interconnection between the shaft 39 and the index plate 45; and it will be further seen that the angular relationship between the index plate and the shaft 39 will depend on the position of the eccentric block 73 with respect to the flanges 75 and 76. This relationship may be better explained by the following discussion;

If it be assumed that the index plate 45 is locked in a given channel position by engagement of the roller 64 with a given notch (being the notch for channel "8" in the showing of Figures 4 and 5), then rotation of the sleeve or tubular shaft 72 by rotation of the knob 74 (the index plate not rotating) will result in corresponding rotation of the eccentric block 73, and corresponding rocking of the plate 67 on the pivot lug 66 of the index plate, due to engagement of the eccentric block with the flanges 75 and 76. Such rocking of the plate 67 about the lug 66 as a pivot will result in swinging of the notch 69 laterally, with corresponding swinging of the lug 43 of the plate 42. Such swing of the lug 43 and plate 42 will result in rock of the shaft 39 in the same direction, thus effecting "correction" of the position of the shaft 39. Since that shaft carries one element (or set of elements) of the variable impedance, it is seen that the final effect of such rotation of the knob 74 is to change the relation (angular) of the variable impedance elements with respect to the notch which is engaged by the roller 64. Thus, while the index plate retains its "channel position" due to engagement of the roller with a given notch, the necessary "correction" has been possible, to ensure exact tuning.

It will also be seen that when the cam block 73 stands in any position with respect to the flanges of the plate 67, there is effected a driving connection between the shaft 39 and the index plate 45. This is true, since rotation of the shaft (by proper manipulation of the tuning knob 41) will result in corresponding rotation of the plate 42 which is secured to the shaft. This rotation of the plate 42 will in turn turn the lug 43 in the same direction, thus exerting a lateral force on the plate 67. Since the flanges 75 and 76 of the plate 67 are engaged by the eccentric block with some degree of firmness, said eccentric block will serve as a pivot about which the plate 67 will be swung; and this swinging of the plate 67 in this manner will serve to shift the pivotal lug 66 of the index plate, thus exerting a turning effort or moment of that index plate. Thus the final effect will be that the turning of the knob 41 will exert a turning force on the index plate, tending to shift that plate from the channel position which it has occupied, and forcing the roller to rise out of the notch which it has been engaging. Thereupon further turning of the knob 41 will serve to move the index plate to the next channel position, as shown by engagement of the roller with the next notch. Thus the rough tuning operation may be carried through to that channel which it is desired to tune.

It is observed that during the operation just explained the engaging force of the roller with the notch of the index plate must be overcome to cause rotary movement of the index plate. This engaging force is determined by the tension of the leaf spring 58, which, as already explained, may be adjusted by rocking the bracket 59 sufficiently and locking it in its rocked position. Also, the greater the engaging force exerted by the roller with the notch of the index plate, the greater the force needed to bring about the above disengagement and rough tuning movement. This also means that the pressure which will be exerted by one of the flanges 75 or 76 against the eccentric will be of magnitude corresponding to the tension of the leaf spring. If the force exerted against such eccentric block should be sufficiently great, taking account of the rotated position of that eccentric block with respect to the plate 67, it is evident that the eccentric block may be caused to rotate without causing rotary movement of the index plate. In this connection it is seen that when the eccentric block is in its central position, as shown in Figure 4, it exerts a maximum leverage or effect on the flanges 75 and/or 76 of the plate 67, so that a maximum mechanical advantage is thus developed under the assumed conditions. However, when the eccentric block has been turned 90 degrees from its position as shown in Figure 4, so that its radius of eccentricity will lie normal to that flange which is being engaged, it is seen that a condition is produced in which the force transmitted from the knob 41 to the index plate through the eccentric block will not produce any turning moment whatsoever on the eccentric block of a nature to change the relation of that block with respect to the plate 67, and the necessary turning force for raising the roller 64 out of the engaged notch can be developed regardless of how great that needed force may be.

It is also noted that the length of the slot 65 through which the lug 43 of the plate 42 extends is sufficient to provide for such amount of "correction" as may be needed in either direction of correction. That slot length will generally be less than the full amount of swing which will be produced in the plate 67 (swinging about the lug 66 as a pivot) by 180 degrees of eccentric rock, so that the lug 43 will in such case engage with one end of the slot 65 or the other end thereof prior to the time the eccentric block has come into the "normal" position above referred to. Then the engagement of the lug 43 with the end of the slot 65 will result in a direct drive from the plate 42 to the index plate, so that all needed force may be transmitted to the index plate for its normal functioning in channel tuning.

Reference will be hereinafter made to Figures 11 and 12 to show how the above described arrangement will serve to effect the needed correction for exact tuning to the selected channel, when approaching such channel from either direction of tuning.

Examination of various figures will show that the edge of the index plate is provided with circular arcuate segments between the successive notches 46—57, inclusive. These normally serve to support the roller 64 during transition from notch to notch, and after the roller has been forced out of the previously engaged notch. It will also be noticed that between the notch group 46—50 and the notch group 51—57, there is the relatively long segment 79, and between the notch group 51—57 and the notch group 46—50 there is the relatively long segment 80. These may be termed transition segments, and they occupy positions which pass the roller location during transition from one channel group to the other, and for other purposes, as will presently appear. It is here mentioned that during these transition movements the switching means are also being shifted to other positions, and also that the variable impedance elements are moving into and through their end positions. These facts will presently appear in more detail.

In the arrangement herein illustrated the tuning to the channels of the low band of television is first effected through channels 2, 3, 4, 5 and 6 to the transition segment 79, and then the tuning through the channels 7, 8, 9, 10, 11, 12 and 13 of the high television band is effected; and these movements are effected sequentially by a continuous rotation of the knob in a given direction, being counter-clockwise when viewed as in Figures 4, 5, 6, 7 and 8. The transition from the low band to the high band channel tuning occurs as the segment 79 passes the roller 64.

Upon leaving the upper channel 13 of the high band of television channels, and continuing rotation counter-clockwise the segment 80 rides past the roller 64. Channel tuning through both the low band and the high band of television has been by rough tuning at the points indicated by the various notches of the index plate, with "correction" possible at the position of each channel as it is reached. It has been stated that for various reasons it is desirable to effect tuning through the FM range by "continuous" tuning, that is, without periodic interruptions due to engagement of notches with the roller 64. We shall now show how it is possible to effect such "continuous" tuning through the FM range, notwithstanding that during the tuning through the FM range the movable variable impedance elements and the shaft 39, and other parts, are again traversing the same half rotation as was traversed during the channel tuning through the low television band.

There is a "shoe" element 81 mounted on the peripheral portion of the index plate. This shoe element is of arcuate form and it embraces an arc segment sufficient to enable the transition operations between high television band and FM range tuning to be effected. This shoe includes a back segment 82 of the necessary arcuate length, and which is provided with the end ears 83 and 84 which overlie the edge of the index plate and reach down somewhat over the front face of that index plate as well shown in Figures 4, 13, 14, 15, 16 and 17. These ears are also so formed that they exert a certain amount of pressing engagement of the shoe element with the edge portion of the index plate, so that an amount of frictional engagement is thus developed between the index plate and the shoe which will meet the requirements of the operations presently to be explained. The result of this frictional engagement is that the shoe tends to follow the rotational movements of the index plate, but nevertheless the shoe may be locked against such following movement, and retained stationary while the index plate continues its rotational movement in the specified direction. This shoe is provided with the outwardly extending lugs 85 and 86 which will engage the arms 62 and/or 63 of the roller pocket element 61, and thus limit the following movement of the shoe in either direction of rotational movement of the index plate. The back segment 82 of the shoe is provided with a deep notch 87 adjacent to the position of the lug 85, and with a shallow notch 88 adjacent to the position of the lug 86; and it is seen from various figures that the deep notch 87 is of such depth and form that when it stands in line with the roller 64, and with the lug 85 engaged with the roller holder, the roller is able to drop into each notch of the index plate as such notch comes into alignment with the roller. Therefore, with the shoe in this position the roller will successively engage the notches during channel tuning for television reception in manner already explained.

In connection with the foregoing, reference to various figures shows that the back segment 82 of this shoe extends outwardly past the edge of the index plate, so that the notch 87 of the shoe will continue to be engaged by the roller, even when such roller has been forced outwardly by a notch of the index plate to enable that index plate to move to another notch position. Due to this extra engagement of the roller with the notch 87 of the shoe it will be seen that rotational movement of the index plate counter-clockwise (when viewed as in Figures 4, 5, 13, 14, 15, 16 and 17) will tend to carry the shoe along to a position where this shoe notch 87 is out of alignment with the roller, but such tendency will be resisted by the engagement of the roller with the said notch 87 even when the index plate notch has disengaged from the roller. Thus, for counterclockwise index plate rotation the proper engagement of the roller with the various notches will be ensured. When rotating the index plate clockwise the engagement of the lug 85 of the shoe will ensure that such shoe is retained in proper position with respect to the roller to enable the roller to properly engage the successive index plate notches.

The shallow notch 88 of the back plate 82 of the shoe is of such depth that when the roller stands in such shallow notch such roller is retained outwardly far enough to just clear the edge of the index plate at all locations between successive index plate notches. Therefore, by shifting the shoe into position where the roller will be received by such shallow notch, and retaining the shoe in such position during tuning through the FM range, it is seen that the roller will not engage the successive notches of the index plate, and "continuous" tuning through the FM range is possible. The form of this shallow notch 88 is such that when the roller is engaged therewith said roller will be retained and the shoe will be engaged by the roller with sufficient force to retain the shoe against following the rotary movement of the index plate in clockwise direction, until another function comes into play to release the roller from this shallow notch.

The plate 42 which is secured to the shaft 39 is provided with a roller raising shoe 44 already referred to, and this shoe is of such radial dimension that it will raise the roller high enough, that is, will move the roller far enough outwardly from the axis of rotation of the shaft 39 to disengage such roller from either the notch 87 or 88 of the shoe, in case the roller has been engaged with either of such notches, or to enable the roller to ride over the V-shaped division 89 between the notches 87 and 88. Also, this shoe 44 has its edges slanted as shown at 90 and 91 on such angles that when this shoe encounters the roller said shoe may force its way readily beneath the roller to raise said roller against the force of the leaf spring. Examination of Figures 4, 5, 13, 14, 15, 16 and 17 also shows that this shoe 44 occupies a position corresponding to the transition segment 80 of the index plate, this being the transition segment corresponding to transfer from the high end of the high television band to the low end of the FM range. It is also evident that this shoe 44 can operate to raise the roller when said shoe approaches the roller from either direction. The operations relating to this shoe 44 and the shoe 81 for change-over from channel tuning by the index plate to continuous tuning through the FM range, and for change-over back from such continuous tuning through the FM range to the channel tuning of the television bands are as follows: For which purpose reference may be had to Figures 13, 14, 15, 16 and 17 which show various of the parts in sequential positions:

Assume that the index plate stands in the position shown in Figure 13, wherein the notch for low band channel 2 is engaged with the roller so that said channel 2 may be exactly tuned in manner already explained. Under these conditions the shoe 44 lies ahead of the roller in the only direction that the parts can be rotated, namely, for channel tuning to higher channel position. Also, the shoe 81 stands on the edge of the index plate in the position shown, wherein the lug 85 is against the roller, and the roller lies within the deep notch 87 so that it may engage the notch for channel 2. It will presently be shown that we have made provision for locking the shaft against rotation clockwise from the position of the parts shown in Figure 13. Now assume that the shaft is turned counter-clockwise from the position of Figure 13 to that of Figure 14. During this operation the shoe 44 will move to the left away from the roller, so that said roller will act under the effect of the leaf spring. As the index plate turns counter-clockwise from the position of Figure 13 each of the notches 3, 4, 5 and 6 will click in receiving the roller which will enter each of them in turn, and as the rotation continues each notch will again raise the roller to the segmental edge of the disk. When the transition position between low band and high band television is reached, corresponding to the transition segment 79, sufficient angular movement will occur to allow for the necessary switching operations, and to take the variable impedances for low band tuning out of service and to bring the variable impedances for high band tuning into service. Then during this movement the roller has been riding on said transition segment 79. When the notch 7 comes to the roller the parts will successively move through channel tuning for the successive high band channels, being a continued rotation in counter-clockwise direction, until the position of Figure 14 is reached in which the notch for high band channel 13 is registered with the roller. Engagement of the roller with this notch for channel 13 will occur in normal manner. It will be seen from examination of Figure 14 that in that figure the shoe 44 has come around by counter-clockwise rotation to a position where it is just ready to ride under the roller which is still engaged with the notch of channel 13.

Having reached the position of Figure 14, further counter-clockwise rotation will transfer into the FM range for continuous tuning through that range, and by use of the same variable impedances as were used during tuning within the low television band. Also, this FM range tuning occurs during a repetition of movements through the same or a duplicate half-rotation of the shaft 39 as was used for low band channel tuning. Slight rotation counter-clockwise from the position of Figure 14 will bring the shoe 44 under the roller, forcing said roller outwardly far enough to completely disengage the roller from the notch 87 and sustaining the roller on the edge of said shoe 44 while said shoe rides under the roller. This operation will require an arcuate movement counter-clockwise sufficient to correspond to carrying the index plate shoe 81 over to position where the shallow notch 88 will stand under the still raised roller. It is noted that when the roller is being retained outwardly by the shoe 44 as just explained, there is no restraining force to prevent the index plate shoe 81 from following the rotation of the index plate, since such rotation is in direction to carry the lug 85 away from the roller pocket 61, and the friction between the index plate shoe and the index plate itself is sufficient to ensure movement of the shoe with the index plate at such time. Accordingly, as the parts move counter-clockwise from the position of Figure 14, the shoe 81 moves to its position as shown in Figure 15, where further movement of the shoe 81 is stopped by engagement of the shoe lug 86 with the other side of the roller retaining pocket 61. In this position the shallow notch 88 of the shoe 81 has moved beneath the roller. As the shaft continues its counter-clockwise rotation from the point where the shoe 81 has come into the position of Figure 15 the shoe 44 moves leftwardly away from the roller and allows said roller to move inwardly into engagement with the shallow notch 88 of the shoe 81. The lug 86 is also thus brought into engagement with the roller so that further leftward or counter-clockwise movement of the shoe 81 is prevented. The roller is now held out far enough to clear the edge of the index plate, and allow rotation of the index plate and shaft and connected parts continuously without stoppage at "indexing points." In other words, continuous tuning is now possible. This condition will continue during the half-rotation which covers tuning through the FM range, and until the position is reached at which such tuning has been completed. In Figure 16 the parts are shown in position where the index plate has come to a position with the notches out of register with the roller, and may represent an FM tuning position. Having brought the parts into condition for continuous tuning through the FM range, such tuning may be continued through that range. It will also be noted that during tuning operations within the FM range the shoe 44 of the plate 42 remains to the left of the index plate shoe and the roller. It is also noted that since the roller is seated in the shallow notch during the movements incident to FM tuning, the index plate shoe 81 is retained by engagement of the roller with such shallow notch against movement with the shoe notwithstanding the frictional engagement of the shoe 81 with the index plate.

If it be assumed that drive from the shaft and the plate 42 to the index plate is effected by engagement of the lug 43 with one end or the other of the slot 65 of the index plate, then it will be seen that during counterclockwise rotation for effecting transition from the high band of television to the FM range the lug 43 will be engaged with the left-hand end of said slot 65 as shown in Figures 14, 15 and 16. Such being the case the shoe 44 must be so related to the parts with which it cooperates that the outward movement of the roller to the position shown in Figure 15 will be properly timed. Thereafter, when rotation of the shaft and the plate 42 is reversed in order to again approach the transition position for transfer to high band television tuning, such rotation will be clockwise. Thus it may be assumed that the lug 43 will have to travel to the other end of the slot 65 before drive to the index plate will commence clockwise (assuming that the eccentric block does not produce such drive by engagement with the flange 76 of the plate 67). When such lug 43 has engaged the right-hand end of the slot 65 and index plate movement clockwise commences, such clockwise movement will continue until the shoe 44 engages the roller to raise it high enough for disengagement from the shallow notch 88. Thereupon, further rotation clockwise will result in carrying the shoe 81 clockwise with the index plate until the lug 85 engages the roller pocket 61 at which point the movement of the shoe 81 will cease, with the deep notch 87 in position to allow the roller to again move down into the notches of the index plate. In Figure 17 the parts have moved clockwise just far enough to bring the shoe 44 into position to raise the roller for the operation just explained. It is thus evident that provision has been made for transfer from "channel" tuning through the two television bands, and for "continuous" tuning through the FM range, all by continuous rotations of the parts through substantially three half rotations.

It is here noted that when the length of the slot 65 is such that swing of the plate 67 occasioned by "corrective" rotation of the eccentric block 73 will carry the lug 43 into engagement with one end or the other of that slot 65 prior to bringing the eccentric block into eccentricity normal to the flanges 75 and 76, it is possible to effect drive of the index plate by rotation of the knob 74, and without the need of rotating the knob 41 which is directly attached to the shaft 39. Under the specifications just above mentioned it is possible to merely rotate the knob 74 in proper direction whereupon the cam block will swing the plate 67 until the lug 43 has jammed against the end of the slot 65, whereupon further rotation of such knob 74 will effect index plate rotation by pressure exerted by the lug 43 against the end of the slot 65. Such operation may then be continued until the proper notch of the index plate has engaged the roller. Thereafter the knob 74 may be turned backwardly for corrective tuning as will hereinafter appear. As an alternative operation, the knob 41 may first be used to rotate the shaft 39 and the plate 42 to carry the lug 43 against the end of the slot 65, whereupon rotation by use of such knob 41 may be continued until the index plate has brought the proper notch into engagement with the roller, and then corrective tuning may be effected by use of the other knob 74 in the proper corrective direction. When operating according to the first-mentioned system it is evident that the knob 41 may be dispensed with, using the knob 74 for all operations.

We have referred to the fact that suitable switching operations are effected during the transition operations, that is, between high and low band television channel tuning, and between television and FM tuning. We shall now refer to such switching operations more in detail:

The shaft 39 is carried through the back plate 31 and its rear end carries the switch operating cam plate 92. Adjacent to this cam plate there is the swinging lever arm 93, pivoted to the lug 94 which extends backwardly from the back plate, such pivoting being at the point 95. Suitable switches are carried by a convenient element of the tuner, and in the arrangement shown these are the three switches 96, 97 and 98 which are carried by a slide bar 99 of insulating material, which slide bar is slidably mounted on the insulating plate 36 already referred to. Conveniently the slide bar 99 is placed directly beneath the plate 36, and each of the switches 96, 97 and 98 is provided with a lug extending down through a slot of the plate 36 and into engagement with such slide bar. These are the slots 100, 101 and 102, best shown in Figures 2 and 8. We will hereinafter again refer to these switches and to the elements which they control; but at this point it may be stated that each of these switches may occupy either of three switching positions, one for low band television, one for high band television, and one for FM range tuning. These three switch positions are attained by merely shifting the bar 99 lengthwise from front to back or vice versa; and in Figures 1, 2 and 3 the bar and the switches are shown in their intermediate position, that for high band television channel tuning.

The cam plate 92 is provided with oppositely disposed cam ears 103 and 104 formed in the peripheral portion of such cam plate by proper deflection of the material of such plate. The ear 103 is formed outwardly or backwardly, and the ear 104 is formed inwardly for forwardly, as is well shown in Figure 2. The arm 93 is provided with two inwardly struck lugs 105 and 106, spaced apart slightly more than the thickness of the cam plate, so that under certain camming movements these lugs can receive the edge portion of the cam plate between them. The upper portion of the arm 93 is provided with an upwardly extending pin portion 107 which extends into an eye 108 of the slide plate 99, so that back and forth swinging movements of the arm 93 are transformed into back and forth sliding movements of the slide bar 99 for switch movements.

In Figure 1 the parts are shown in their high band television position, and it will be seen that the edge portion of the cam plate 92 is embraced between the lugs 105 and 106 of the arm 93. Such condition will continue during rotation of the cam plate in either direction from that shown in Figure 1, until either of the ears 103 or 104 comes to the position of the lugs 105 and 106. If the shaft 39 be rotated counterclockwise from the position shown in Figure 4 (being clockwise when viewed as in Figure 9), such rotational movement will continue through the high band television range until the transfer point is reached for transition to FM tuning. This transition condition will occur when the shoe 44 comes around to the roller, and when the segment 80 of the index plate also comes around to position adjacent to the roller, as already explained; and at the same time the cam plate 92 will have come around clockwise to the point where the ear 104 engages the lugs 105 and 106. Further rotation of the parts will result in said ear 104 pressing the arm 93 towards the left (in Figure 1), thus shifting the slide bar 99 leftwardly to the FM switching position. Contrarily, had the rotation of the shaft 39 been clockwise (when viewed as in Figure 4, or counterclockwise when viewing the cam plate 92 as in Figure 9), the ear 103 would have been engaged with the lugs 105 and 106, and the arm 93 would have been swung to the right in Figure 1, thus sliding the bar 99 also to the right and carrying the switches to the right-hand or low television band position. In Figures 1, 2 and 3 the three positions of the pin 107 for FM, low band, and high band are indicated appropriately for reference.

We have referred to the fact that provision has been made for limiting the rotational movement properly in either direction of rotation, that is, at the low end of the low band of television, and at the high end of FM tuning. The cam plate 92 and the lugs 105 and 106 of the arm 93 provide convenient means to effect such limiting operations. To this end we have provided the inwardly extending lug 109 (forwardly extending) adjacent to the ear 103, and the outwardly or rearwardly extending lug 110 adjacent to the ear 104. These lugs will engage the lugs 105 and 106 of the arm 93 at proper times and lock the cam plate rotation accordingly, thus also locking the shaft 39 and connected parts in such limited positions. It will be found that by forming these lugs 109 and 110 as just explained, the one reaching forwardly, and the other backwardly, they will respectively engage the lugs 105 and/or 106 of the arm 93 at proper times, and at the same time allow for the desired three half rotations of the cam plate and the shaft. Of course the various parts, including the cam plate with its ears and its limit lugs, the arm 93, the slide plate 99, and the switch elements must be properly coordinated with respect to the index plate, the roller, and other parts to effect proper timing of operations; and in the several figures we have shown approximately the proper timing of such parts. Thus, for example, the movements of the slide plate 99 for changing switch positions, must occur during the transition movements of the shaft and index plate, etc., and during the movement of the segments 79 and 80 past the roller position. We shall presently refer more in detail to the movable elements of the variable impedances, and these, too, must be properly timed with respect to various other parts.

Referring now to Figure 21 we have therein shown by wiring diagram a typical tuner wiring scheme embodying the features hereinbefore referred to, and also the tuner arrangements previously described herein. In this case provision is made for reception of signals through the antenna connection including terminals 111 and 112 passing the signals through a transformer arrangement 113, for delivery to the grid circuit 114 of the RF amplifier tube 115. The plates of this tube deliver to the switch element 96 which controls delivery to the tuning section 116, which section may be brought into various tuning conditions according to the position of such switch element 96. This tuning section 116 is arranged to be made resonant to the desired incoming frequency of signal, and is in effect a selector section. The tuned frequency delivered by this section 116 is delivered to a second section 117 which may also be tuned to the desired incoming signal frequency for resonance, said section 117 constituting in effect a supplemental section. This section 117 is controlled by the switch 97 to provide the connections within such section 117 according to the position of such switch. From this section 117 the signals are delivered to a mixer tube grid 118. From this tube 118 there is delivered signals which subsequently result in the operation of the kinescope element of the television receiver, such signals being delivered over the line 119. There is delivered over this line 119 an intermediate frequency channel on a relatively broad band for picture operation, and we have not herein shown the details of the picture interpretation circuit as these are well known in this and related arts.

The tuner unit also includes a third section 120 which is connected to the second section 117, and may be adjusted for resonance to the desired frequency of an oscillator tube 121. This third section 120 is connected by a switch 98 to the grid of such tube 121, and by shifting this switch into various positions the proper connections are effected according to the principles which have already been stated.

There is provided an intermediate frequency transformer (or sound trap) 120ª which delivers a sound intermediate channel frequency over the line 122; and this transformer also serves to separate the two intermediate frequencies, that for the sound intermediate frequency line 122 to the speaker, and that for the kinescope over the line 119. Thus it is evident that the lines 119 and 122 deliver the two intermediate frequencies, that for operation of the kinescope, and that for operation of the sound speaker, and that the present tuning unit is arranged to deliver these two intermediate frequencies when the tuning unit is tuned for reception from a selected station operating on its frequency within either the low or the high band television, or on FM frequency.

The three sections 116, 117 and 120 are provided with variable impedance elements whereby the selected frequencies may be tuned whereupon the proper intermediate frequencies will be delivered over the lines 119 and 122. These sections 116, 117 and 120 include the following elements:

The section 116 includes the high band variable impedance element 123 and the adjusted impedance element 124 in parallel connection therewith, and the low band variable impedance element 125 and the fixed impedance element 126 and the adjusted impedance element 127 in parallel connection therewith; the section 117 includes the high band variable impedance element 128 and the adjusted impedance element 129 in parallel connection therewith, and the low band variable impedance element 130 and the fixed impedance element 131 and the adjusted impedance element 132 in parallel connection therewith; and the section 120 includes the high band variable impedance element 133 and the adjusted impedance element 134 in parallel connection therewith, and the low band variable impedance element 135 and the fixed impedance element 136 and the adjusted impedance element 137 in parallel connection therewith. Also, the section 116 includes the shunt impedance element 138, the section 117 includes the shunt 139, and the section 120 includes the shunt 140.

In the embodiment illustrated the variable impedance elements 123, 125, 128, 130, 133 and 135 are all variable inductances, the shunts 138, 139 and 140 are all inductances, and the fixed and adjusted impedances 124, 127, 129, 132, 131, 134, 137 and 136 are all capacitances. It is here noted that during reception of low band television channels the elements 125, 126 and 127 of the section 116 are in use, the elements 130, 131 and 132 of the section 117 are in use, and the elements 135, 136 and 137 of the section 120 are in use; that during reception of high band television channels the elements 123 and 124 of the section 116 are in use, the elements 128 and 129 of the section 117 are in use, and the elements 133 and 134 of the section 120 are in use; and that during FM reception the elements 125, 126 and 127, and also the shunt element 138 of the section 116 are in use, the elements 130, 131, and 132, and also the shunt element 139 of the section 117 are in use, and the elements 135, 136 and 137, and also the shunt element 140 are in use, of the section 120.

Conveniently each variable impedance inductance element comprises one or more stationary U-shaped inductors 141 (see Figure 8) having the arcuate arms 142 and 143 whose lower ends are connected together, and whose upper ends are brought out through the top plate 36 of insulating material; together with a generally semicircular rotor plate 144 adjacent to but not in physical contact with the arms of such inductor, so that by rotation of such plate the impedance effect of the inductor element may be varied through a considerable range. Examination of Figures 1, 2, 3 and 10 shows that each of the variable impedances 123, 128 and 133 for the high band television channels includes a single stationary inductor element, together with two adjacent rotor elements, one adjacent to each face of the stator element; that the variable impedance 125 for low band television channels, and for FM range reception, includes two stationary inductor elements, together with a single adjacent rotor element; and that each of the variable impedances 130 and 135 for low band television channels, and for FM range reception, includes four stationary inductor elements, together with three intermediate rotor elements. This is, of course a matter of design in respect to the impedance capacity required for the various operations.

Examination, especially of Figure 8 shows that the typical rotor element or plate 144 for each of the variable impedances 123, 128 and 133 for high band television channels is in substantially raised position (corresponding to the channel 8 position illustrated), and that each of the rotor elements or plates $144^a$ for each of the variable impedances 125, 130 and 135 for low band television reception, and for FM range tuning is in substantially lowered position (corresponding to the channel 8 position illustrated). Thus the rotor elements for the high band television reception are opposed by 180 degrees to the positions of the rotor elements which are used for low band television reception and for FM range reception. For this reason, as tuning is effected through the low band range from channel to channel to higher channels, more and more engagement of the low band rotors occurs until full engagement occurs, and in which position the rotors for the high band range are ready to commence engagement with their respective stators. Then, as tuning through the high band range occurs the rotors for such range move more and more into their respective stators, the rotors for the low band channels moving out of their respective stators until the half rotation is completed. In other words, during one half rotation the rotors for low band are moving into their stators, and the rotors for high band are moving out of their stators; and during the next half rotation the rotors are high band are moving into their stators, and the rotors for low band are moving out of their stators. Finally, during the third half rotation, for FM range reception, the rotors for low band are again moving into their stators and the rotors for high band are again moving out of their stators. Thus it is possible, by use of two sets of rotors corresponding to low band and to high band channels reception, to make use of these in sequence, through half rotational movements, and to use the rotors for low band channel reception also for FM reception, as will presently appear.

Referring to Figure 21 again, the switch elements 96, 97 and 98 comprise slide bars 145, 146 and 147, said bars being provided with the prongs 148, 149 and 150, 151, 152 and 153, and 154, 155 and 156, respectively. The plates of the tube 115 are connected to the slide bar 145 by the line 157, the grid of the tube 118 is connected to the slide bar 146 by the line 158, and the grid of the tube 121 is connected to the slide bar 147 by the line 159. The low band elements 125, 126 and 127 are jointly connected to a contact 160 of the switch 96, the high band elements 123 and 124 are jointly connected to a contact 161 of the switch 96, and the shunt element 138 is connected to a contact 162 of the switch 96; the low band elements 130, 131 and 132 are jointly connected to a contact 163 of the switch 97, the high band elements 128 and 129 are jointly connected to a contact 164 of the switch 97, and the shunt element 139 is connected to a contact 165 of the switch 97; and the low band elements 135, 136 and 137 are jointly connected to a contact 166 of the switch 98, the high band elements 133 and 134 are jointly connected to a contact 167 of the switch 98, and the shunt element 140 is connected to a contact 168 of the switch 98.

The several contacts 160, 161 and 162, 163, 164 and 165, and 166, 167 and 168, are so placed that when the slide bar 99 (to which the switch slide bars 145, 146 and 147 are connected) stands at its rearmost position (that is, away from the observer when viewed as in Figures 4, 5, 6, 7 and 8) the prong 149 will engage the contact 160 for low band condition in section 116, both of the contacts 161 and 162 being disengaged, the prong 152 will engage the contact 163 for low band condition in section 117, both of the contacts 164 and 165 being disengaged, and the prong 155 will engage the contact 166 for low band condition in section 120, both of the contacts 167 and 168 being disengaged. Thus with the slide bar 99 at rearmost position all sections are connected for low band condition. Likewise, when the slide bar 99 stands in its central position the prong 148 will engage the contact 161 for high band condition in section 116, both of the contacts 160 and 162 being disengaged, the prong 151 will engage the contact 164 for high band condition in section 117, both of the contacts 163 and 165 being disengaged, and the prong 154 will engage the contact 167 for high band condition in section 120, both of the contacts 166 and 168 being disengaged. Thus with the slide bar 99 at central position all sections are connected for high band condition. Likewise, when the slide bar 99 stands in its forwardmost position the prongs 149 and 150 will simultaneously engage the contacts 162 and 160 respectively, for placing both the low band elements and the shunt of the section 116 in connection for FM range reception, the prongs 152 and 153 will simultaneously engage the contacts 165 and 163 respectively, for placing both the low band elements and the shunt of the section 117 in connection for FM range reception, and the prongs 155 and 156 will simultaneously engage the contacts 168 and 166, respectively for placing both the low band elements and the shunt of the section 120 in connection for FM range reception. In Figure 21 the parts are shown in their position for FM range reception.

In Figure 21 we have shown the mechanical connections to the several variable impedances 123, 125, 128, 130, 133 and 135 whereby they are simultaneously moved for impedance variation, by the dashed line 169 which corresponds to the shaft 39, to which are connected the dashed lines 170, 171, 172, 173, 174 and 175 corresponding to the connections of the various rotor plates 144 to $144^a$ to said shaft 39. In the case of the variable impedances 125, 130 and 135, wherein each is provided with several stator inductors these inductors may be connected together in such manner as needed to provide the desired impedance, generally by series connection as shown in Figure 21.

Reference has been made to provision for cutting off current supply to the kinescope or picture projector during operation for FM range reception, or for giving a signal or effecting some desired ancillary circuit change when passing from the television reception condition to the FM range reception or vice versa. We have shown the insulating block 176 carried by the back plate 31 of the frame of the tuner. This block carries the two leaf contacts 177 and 178 which are insulated from each other and constitute a portion of the current supply circuit for the kinescope, the lines 179 and 180 being connected to said leaf contacts and constituting a portion of such circuit. The slide bar 99 carries the insulating block 181 which is in position to engage the end of the leaf contact 177 as the slide bar passes from the high band (central) position to the FM range (forward) position, thus moving the leaf 177 away from the leaf 178 during such transition movement, and thereby opening the circuit for kinescope current supply. The leaf 177 is normally spring biased to move into engagement with the leaf 178 when the slide bar stands in either its central or its rearmost position (for high band and low band television reception). This switch is also shown schematically in Figures 18, 19 and 20 which show certain of the operations in the three slide bar positions.

It is believed that the showings of Figures 11 and 12 will be readily understood from the previous description, and detailed description of these figures is unnecessary. It is here pointed out, however, that in the design of the tuner the index plate notches should be so placed that they closely approximate the central or exact tuned positions for the several television channels, so that exact tuning can be effected by movement of the shaft in whichever direction is needed for that purpose. Such correction movement will generally be small in amount and readily taken care of by an eccentric cam block of small eccentricity. Also, by locating the notches as just explained it will be possible to secure correction to exact tuning when approaching a given channel from either direction, that is, from either a higher or a lower numbered channel.

In Figures 18, 19 and 20 we have shown schematically the principal operating parts in three positions corresponding to low band, high band, and FM range reception. In each case we have also shown a dial or scale 182 suitably marked for the various bands and for FM together with a pointer 183 which travels over such scale in harmony with the rotations of the shaft 39. Such movements are produced by a small drum 184 mounted on the shaft behind the plate 42, and carrying several turns of a cord 185 which passes over suitable pulleys 186 and is connected to the pointer 183, thus operating in well understood manner.

When tuning in the FM range the roller 64 is disengaged from the notches of the indexing plate and is retained by the shallow notch 83 of the shoe 81, thus permitting "continuous" tuning by rotation of the knob 41. During such continuous tuning in the FM range the index plate will rotate to a stopping point corresponding to the tuning of the desired FM station. It is then possible to produce corrective movements of the shaft 39 by use of the knob 74 to turn the eccentric block 73. When operating in the television bands the notches of the index plate serve to retain said plate stationary during such correction operations, and serve to retain the lug 66 stationary during such correction operations, the plate 67 pivoting on said lug 66 during such correction movements. The reactive force generated against this lug during such correction movements tends to rotate the index plate in contrary direction but such tendency is resisted by the engagement of the roller with the index plate notch. Since the roller is not engaged with the index plate notch (or any or such notches) during the FM tuning it is necessary to make other provision for holding the index plate stationary for corresponding correction tuning which in the FM range.

When in the FM range the roller is engaged with the shallow notch 83 of the shoe 81, as already stated. Thus said shoe is retained stationary during the correction tuning in the FM range. The friction developed between said shoe 81 and the edge portion of the index plate is sufficient to hold the index plate stationary against the reactive force needed for such correction tuning. It is further noted that when the roller is forced outwardly far enough to engage this shallow notch 83 the leaf spring 58 is placed under increased tension as compared to its tension when the roller is not forced out so far, as when said roller engages the notches of the index plate. For this reason the frictional engagement of the shoe 81 with the edge of the index plate is increased during FM range tuning as compared to the frictional engagement when in the television tuning band positions. These factors work together to ensure that when tuning in the FM range there will be developed a sufficient holding force on the index plate, regardless of the exact position of such plate, to ensure that the reaction against the lug 66 developed during correction movements in the FM range will not cause the index plate to move from the position to which it was purposely moved by the knob 41. It is thus possible to produce correction tuning the FM range as well as in the two television band ranges.

In Figures 1 and 2 the variable impedances 130 and 135 are each shown as comprising a number of stator elements and corresponding movable plates, the latter being carried by the shaft 39. These variable impedances comprise portions of the sections 117 and 120 shown in the wiring diagram of Figure 21. Both of these variable impedances are in circuit for both the low band television operation and the FM range operation. Since both of these variable impedances are contained within the tuner and are relatively close together there will be cross-coupling between them during operation on low band television or FM range reception.

Examination of Figure 2 shows that the terminals of the stator elements of the impedance 130 are connected in series by the short connections 186[a] and that the terminals of the stator elements of the impedance 135 are connected in series by the short connections 187. All these connections are so made that the two variable impedances 130 and 135 are in opposition as respects any cross coupling (principally inductive coupling) tendency in the tuner, so that any detrimental effects of such cross-coupling are reduced.

We claim:

1. A tuner for tuning a radio receiving circuit to a selected frequency included in a band of frequencies, said tuner including a variable impedance element having a rotary impedance varying member, said variable impedance element comprising a portion of the receiving circuit elements, means to rotate said rotatable impedance varying member through a range of rotation corresponding to said band of frequencies, an element movable through a limited range of movement with respect to said rotating means, means to restrain said limited range movement element at a position substantially corresponding to the position of said rotatable impedance varying member for tuning said selected frequency, together with an adjustable connection between said limited range movement element and said impedance varying member rotating means, said adjustable connection being so constituted as to enable movement of the impedance varying member rotating means through exact tuning position for said selected frequency while said limited range movement element is restrained against movement by said restraining means, said limited range movement element comprising a plate having an irregularity in its contour, and said restraining means comprising a spring pressed element to engage said irregularity.

2. A tuner for tuning a radio receiving circuit to a selected frequency included in a band of frequencies, said tuner including a variable impedance element having a rotary impedance varying member, said variable impedance element comprising a portion of the receiving circuit elements, means to rotate said rotatable impedance varying member through a range of rotation corresponding to said band of frequencies, an element rotatable through a limited range of movement with respect to said rotating means, means to restrain said limited range movement element at a position substantially corresponding to the position of said rotatable impedance varying member for tuning said selected frequency, together with an adjustable connection between said limited range movement element and said impedance varying member rotating means, said adjustable connection being so constituted as to enable movement of the impedance varying member rotating means through exact tuning position for said selected frequency while said limited range movement element is restrained against movement by said restraining means, said adjustable connection comprising a cam connection between said limited range movement element and said impedance varying member rotating means, together with operator means to move said cam connection.

3. A tuner for tuning a radio receiving circuit to a selected frequency included in a band of frequencies, said tuner including a variable impedance element having a rotary impedance varying member, said variable impedance element comprising a portion of the receiving circuit elements, means to rotate said rotatable impedance varying member through a range of rotation corresponding to said band of frequencies, an element movable through a limited range of movement with respect to said rotating means, means to restrain said limited range movement element at a position substantially corresponding to the position of said rotatable impedance varying member for tuning said selected frequency, together with an adjustable connection between said limited range movement element and said impedance varying member rotating means, said adjustable connection being so constituted as to enable movement of the impedance varying member rotating means through exact tuning position for said selected frequency while said limited range movement element is restrained against movement by said restraining means, said adjustable connection comprising a lever element, pivotal connections between said lever element and the limited range movement element and the impedance varying rotating means, and operator means to rock said lever element.

4. Means as specified in claim 1 wherein said adjustable connection comprises a cam connection between said limited range movement element and said impedance varying member rotating means, together with operator means to move said cam connection.

5. A tuner for tuning a radio receiving circuit to any selected frequency included in a band of frequencies, said tuner including a variable impedance element having a rotary impedance varying member, said variable impedance element comprising a portion of the receiving circuit elements, means to rotate said rotatable impedance varying member through a range of rotation corresponding to said band of frequencies, an element movable through a limited range of movement with respect to said rotating means, means to restrain said limited range movement element at different positions corresponding substantially to positions of said rotatable impedance varying member for tuning different frequencies within said band of frequencies, together with an adjustable connection between said limited range movement element and said impedance varying member rotating means, said adjustable connection being so constituted as to enable movement of the impedance varying member rotating means through exact tuning position for each restrained position of said limited range movement element while said limited range movement element is restrained against movement, said limited range movement element comprising a circular plate having irregularities corresponding in position to restraining positions of said element for frequencies to be tuned within said band of frequencies.

6. A tuner for tuning a radio receiving circuit to any selected frequency included in a band of frequencies, said tuner including a variable impedance element having a rotary impedance varying member, said variable impedance element comprising a portion of the receiving circuit elements, means to rotate said rotatable impedance varying member through a range of rotation corresponding to said band of frequencies, an element movable through a limited range of movement with respect to said rotating means, means to restrain said limited range movement element at different positions corresponding substantially to positions of said rotatable impedance varying member for tuning different frequencies within said band of frequencies, together with an adjustable connection between said limited range movement element and said impedance varying member rotating means, said adjustable connection being so constituted as to enable movement of the impedance varying member rotating means through exact tuning position for each restrained position of said limited range movement element while said limited range movement element is restrained against movement, said limited range movement element comprising a circular plate having a series of notches in its periphery corresponding in position to restraining positions of said element for frequencies to be tuned in said band of frequencies, and wherein said restraining means comprises a spring pressed element in position to engage said notches sequentially as the plate is rotated to produce restraints of such rotary movement at positions substantially corresponding to successive frequencies to be tuned within said band.

7. A tuner for tuning a radio receiving circuit to any selected frequency in each of two bands of frequencies, said tuner including a variable impedance element for each of said bands, each of said variable impedance elements including a rotary impedance varying member, said variable impedance elements comprising portions of the receiving circuit elements, means to simultaneously rotate said rotatable impedance varying elements through a range of rotation corresponding to both of said bands of frequencies, one zone of said range of rotation corresponding to frequencies tuned in one band and another zone of said range of rotation corresponding to frequencies tuned in the other band, each rotatable impedance varying member being effective to vary the tuning frequency during rotation through the zone of rotation corresponding to the band tuned by the variable impedance element of which such rotatable impedance varying member is a part.

8. A tuner for tuning a radio receiving circuit to any selected frequency in each of two bands of frequencies, said tuner including a variable impedance element for each of said bands, each of said variable impedance elements including a rotary impedance varying member, said variable impedance elements comprising portions of the receiving circuit elements, means to simultaneously rotate said rotatable impedance varying elements through a range of rotation corresponding to both of said bands of frequencies, one zone of said range of rotation corresponding to frequencies tuned in one band and another zone of said range of rotation corresponding to frequencies tuned in the other band, each rotatable impedance varying member being effective to vary the tuning frequency during rotation through the zone of rotation corresponding to the band tuned by the variable impedance element of which such rotatable impedance varying member is a part, together with means to restrain rotary movement of said rotary impedance varying parts substantially at the position of each frequency to be tuned within such band of frequencies.

9. A tuner for tuning a radio receiving circuit to any selected frequency in each of two bands of frequencies, said tuner including a variable impedance element for each of said bands, each of said variable impedance elements including a rotary impedance varying member, said variable impedance elements comprising portions of the receiving circuit elements, means to simultaneously rotate said variable impedance varying elements through a range of rotation corresponding to both of said bands of frequencies, one zone of said range of rotation corresponding to frequencies tuned in one band and another zone of said range of rotation corresponding to frequencies tuned in the other band, each rotatable impedance varying member being effective to vary the tuning frequency during rotation through the zone of rotation corresponding to the band tuned by the variable impedance element of which such rotatable impedance varying member is a part, together with switching means in connection with each of said variable impedance elements, connections between said variable impedance elements, said receiving circuit, and said switching means to control connection of each variable impedance element with said receiving circuit, an operative connection between said rotary impedance varying means and said switching means, said operative connections being effective to move said switching means to position to include one of said variable impedance elements in tuning connection with said receiving circuit when rotating in one of said zones, and being effective to move said switching means to position to include the other of said variable impedance elements in tuning connection with said receiving circuit when rotating in the other of said zones.

10. A tuner for tuning a radio receiving circuit to any selected frequency in each of two bands of frequencies, said tuner including a variable impedance element for each of said bands, each of said variable impedance elements including a rotary impedance varying member, said variable impedance elements comprising portions of the receiving circuit elements, means to simultaneously rotate said rotatable impedance varying elements through a range of rotation corresponding to both of said bands of frequencies, one zone of said range of rotation corresponding to frequencies tuned in one band and another zone of said range of rotation corresponding to frequencies tuned in the other band, each rotatable impedance varying member being effective to vary the tuning frequency during rotation through the zone of rotation corresponding to the band tuned by the variable impedance element of which such rotatable impedance varying member is a part, together with another impedance of fixed value, switching means therefor, and connections including said fixed value impedance, said switching means, and one of said variable impedance elements, whereby the tuning range of said tuner when operating in the zone of said variable impedance element may be changed according to the switching positions of said switching means.

11. Means as specified in claim 8 wherein said restraining means is yieldable.

12. Means as specified in claim 9, together with another impedance of fixed value, switching means therefor, and connections including said fixed value impedance, said switching means last recited, and one of said variable impedance elements, whereby the tuning range of said tuner when operating in the zone of said variable impedance element may be changed according to the switching position of said switching means last recited.

13. A tuner for tuning a radio receiving circuit to any selected frequency in each of two bands of frequencies, the frequencies within one band all being greater than the frequencies in the other band, said tuner including a variable impedance element including a rotatable impedance varying member, said variable impedance element comprising a portion of the receiving circuit elements, means to rotate said rotatable impedance varying element through a zone of rotary movement from end to end of said zone and corresponding to tuning to frequencies from end to end of one band of frequencies, another impedance of fixed value, switching means, connections between said variable impedance element, said impedance of fixed value, and said receiving circuit elements, effective to include the variable impedance element in the receiving circuits when said switching means is in one position, and effective to also include said fixed value impedance element in said receiving circuits when said switching means is in another position, said receiving circuit being effective to tune to frequencies within one of said bands when the variable impedance element is in circuit connection and being effective to tune to frequencies within the other of said bands when both said variable impedance element and said fixed value impedance element are in circuit connection, operative connections between the rotating means for the rotatable impedance varying member and said switching means effective to move said switching means to position to exclude the fixed value impedance from the receiving circuits for tuning to frequencies within one band and to move said switching means to position to include said fixed value impedance in the receiving circuits for tuning to frequencies within the other band, said operative connections being effective to move said switching means to one position when said rotating means moves away from one end of its zone of movement and being effective to move said switching means to its other position when said rotating means moves into said zone of movement from the same end of said zone.

14. Means as specified in claim 13 wherein said band which is tuned when said fixed value impedance is excluded from the receiving circuits is of lower frequency range than the frequency of the band which is tuned when said fixed value impedance is included in the receiving circuits.

15. Means as specified in claim 13 wherein said band which is tuned when said fixed value impedance is excluded from the receiving circuits is the low band of television reception.

16. Means as specified in claim 15 wherein the band which is tuned when said fixed value impedance is included in the receiving circuits is the FM range of reception.

17. Means as specified in claim 13 wherein said variable impedance is an inductance and wherein said fixed value impedance is also an inductance.

18. Means as specified in claim 13 wherein said variable impedance is a capacitance, and wherein said fixed value impedance is also a capacitance.

19. Means as specified in claim 13 wherein said variable impedance is a capacitance, and wherein said fixed value impedance is an inductance.

20. Means as specified in claim 13 wherein said variable impedance is an inductance, and wherein said fixed value impedance is a capacitance.

21. Means as specified in claim 13 wherein said variable and fixed impedances produce voltage components of the same vector sign.

22. Means as specified in claim 13 wherein said variable and fixed impedances produce voltage components of opposite vector sign.

23. A tuner for tuning a radio receiving circuit to any selected frequency in each of two bands of frequencies of which bands the proximate ends are separated by the amount of another intermediate range of frequencies to be tuned by said tuner, said two bands comprising a low band and a high band, respectively, said tuner including a variable impedance element for said low band and a variable impedance element for said high band, each of said variable impedance elements including a rotary impedance varying member, each rotary impedance varying member being operable to vary the impedance of its variable impedance element between upper and lower limits of impedance by substantially 180 degrees of rotary movement, a driving connection between said rotary impedance varying members, and the two rotary impedance varying members acting in alternate sequence to vary the impedances of their respective variable impedances in the same direction of variation with continuous rotation of said members in a given direction, said rotary impedance varying members being rotatable through substantially three contiguous half revolutions of rotation between limits of movement, switching means, a fixed impedance element, connections including said switching means, said low band variable impedance element, said high band variable impedance element, said fixed value impedance element and said receiving circuit elements, effective to include said low band variable impedance element in circuit with said receiving circuit elements when said switching means is in one position, and effective to include said high band variable impedance element in circuit with said receiving circuit elements when said switching means is in another position, and effective to include said fixed impedance element and one of said variable impedance elements in circuit with said receiving circuit elements when said switching means is in a third position, together with operative connections between said driving connection between the rotary impedance varying members and the switching means effective to move said switching means from position to position substantially at conclusion of each half revolution of the rotary impedance varying members in a given direction and commencement of another half revolution thereof in the same direction, effectively to connect said low band and high band variable impedance elements in circuit with the receiving circuit elements sequentially during successive half revolutions, and to connect said fixed value impedance and one of said variable impedances in connection with said receiving circuit elements during a third sequential half revolution.

24. Means as specified in claim 23 wherein during the sequence of movements the low band variable impedance is connected in circuit during the first half revolution in a given direction, and wherein the high band variable impedance is connected in circuit during the second half revolution in said direction, and wherein the low band variable impedance and the fixed impedance are connected in circuit during the third half revolution.

25. Means as specified in claim 23, wherein there are provided transition stages between the successive half revolution movements, and wherein the switch movements occur during such transition stages of movement.

26. Means as specified in claim 23 wherein the tuner is adapted for tuning to any selected channel of television channels within the low and high bands, and wherein the tuner is adapted for tuning to any selected FM station within said intermediate range of frequencies.

27. Means as specified in claim 26, together with means to produce an increased drag on the rotary movement of the rotary elements at the position of each television channel.

28. A tuner for tuning a radio receiving circuit to any selected frequency in each of two bands of frequencies of which bands the proximate ends are separated by the amount of another intermediate range of frequencies to be tuned by said tuner, each of said bands including a plurality of channels to be tuned and said intermediate range including a plurality of frequencies to be tuned, said tuner including variable impedance means and a receiving circuit including said variable impedance means, said variable impedance means including a rotary impedance varying member, means to restrain rotary movement of said rotary impedance member substantially at positions corresponding to channels of said bands to be tuned, and means to make said restraining means ineffective during tuning through the said intermediate tuning range.

29. A tuner for tuning a radio receiving circuit to any selected frequency in each of two bands of frequencies each including a plurality of television channels, and for tuning to any selected frequency of a range of frequencies different from the frequencies embraced in said bands, said tuner including a variable impedance means and a receiving circuit including a rotary impedance varying member, means to restrain rotary movement of said rotary variable impedance member at positions corresponding substantially to channels to be tuned, and means to make said restraining means ineffective when tuning through said range of frequencies other than said bands, to thereby permit continuous tuning through said range.

30. A tuner for radio reception including two variable impedance units comprising two sets of planar impedance elements, each set including a plurality of planar stator elements and cooperating rotor elements, all of said stator and rotor elements being located in successive planes lying substantially normal to a common axis, rotary supporting means for the rotor elements, said rotor elements being located in substantial axial alignment to simultaneously move into and out of impedance relation to the stator elements with which they cooperate, and series connections between the successive stator elements of each impedance unit, said series connections between the stators of one impedance unit being reversed as compared to the series connections between the stators of the other impedance unit to thereby reduce cross coupling between the two impedance units.

31. A tuner as specified in claim 30 wherein said impedance units are inductance units, and wherein the stators of said impedance units are inductors.

FRANK NIENABER.
MARTIN HENDERSON.
EMIL L. RANSEEN.
CHESTER W. LYTLE.

REFERENCES CITED

The following references are of record in the file of this patent:

UNITED STATES PATENTS

| Number | Name | Date |
|---|---|---|
| 2,381,227 | Richards | Aug. 7, 1945 |
| 2,521,963 | Beusman | Sept. 12, 1950 |